United States Patent
Srivastava

(10) Patent No.: US 8,930,123 B2
(45) Date of Patent: Jan. 6, 2015

(54) SYSTEMS AND METHODS FOR DETERMINING TRAFFIC INTENSITY USING INFORMATION OBTAINED THROUGH CROWDSOURCING

(75) Inventor: Biplav Srivastava, Noida (IN)

(73) Assignee: International Business Machines Corporation, Armonk, NY (US)

(*) Notice: Subject to any disclaimer, the term of this patent is extended or adjusted under 35 U.S.C. 154(b) by 507 days.

(21) Appl. No.: 12/950,012

(22) Filed: Nov. 19, 2010

(65) Prior Publication Data

US 2012/0130625 A1  May 24, 2012

(51) Int. Cl.
*G01C 21/00* (2006.01)
*G01C 21/34* (2006.01)
*G08G 1/01* (2006.01)

(52) U.S. Cl.
CPC .......... *C08G 1/0112* (2013.01); *G01C 21/3492* (2013.01); *G08G 1/0133* (2013.01)
USPC ........... 701/119; 701/400; 701/414; 701/415; 701/423; 701/431; 340/988; 340/990; 340/995.1

(58) Field of Classification Search
CPC .... G01C 21/00–21/005; G01C 21/26–21/3685
See application file for complete search history.

(56) References Cited

U.S. PATENT DOCUMENTS

| | | | |
|---|---|---|---|
| 5,617,086 A | 4/1997 | Klashinsky et al. | |
| 5,696,502 A | 12/1997 | Busch et al. | |
| 5,812,069 A | 9/1998 | Albrecht et al. | |
| 7,689,348 B2 | 3/2010 | Boss et al. | |
| 2001/0029425 A1* | 10/2001 | Myr | 701/200 |
| 2005/0171649 A1* | 8/2005 | Adachi | 701/1 |
| 2005/0259606 A1* | 11/2005 | Shutter et al. | 370/317 |
| 2005/0288856 A1* | 12/2005 | Uyeki et al. | 701/210 |
| 2006/0064237 A1* | 3/2006 | Mbekeani et al. | 701/117 |
| 2007/0038363 A1* | 2/2007 | McGrath | 701/117 |
| 2007/0138347 A1* | 6/2007 | Ehlers | 246/1 R |
| 2007/0290839 A1* | 12/2007 | Uyeki et al. | 340/539.13 |
| 2008/0071465 A1* | 3/2008 | Chapman et al. | 701/117 |
| 2009/0070024 A1* | 3/2009 | Burchard et al. | 701/117 |
| 2009/0082950 A1* | 3/2009 | Vorona | 701/119 |
| 2009/0143966 A1* | 6/2009 | Jacobson et al. | 701/118 |
| 2009/0157311 A1* | 6/2009 | Seltzer et al. | 701/210 |
| 2009/0326791 A1* | 12/2009 | Horvitz et al. | 701/119 |
| 2010/0063715 A1* | 3/2010 | Wynter et al. | 701/118 |
| 2010/0094530 A1* | 4/2010 | Phuyal et al. | 701/117 |

(Continued)

FOREIGN PATENT DOCUMENTS

WO  2008 021551  2/2008

OTHER PUBLICATIONS

Varga, Istvan, et al., "Design of an Intelligent Traffic-Control System"; available at URL: http://www.ercim.eu/publication/Ercim_News/ens65/varga.html as of Jul. 27, 2010.

(Continued)

*Primary Examiner* — Jonathan M Dager
(74) *Attorney, Agent, or Firm* — Ference & Associates LLC

(57) ABSTRACT

Systems and associated methods for utilizing crowdsourcing probes to obtain traffic information are described. Such traffic information includes location, date, time, speed, and speed limit information. Embodiments allow for the determination of traffic intensity, or road congestion, through the calculation of a road speed capacity factor. Embodiments provide that the traffic information and traffic intensity information may be visualized through a user interface.

16 Claims, 5 Drawing Sheets

(56) References Cited

U.S. PATENT DOCUMENTS

| | | | | |
|---|---|---|---|---|
| 2010/0094532 | A1* | 4/2010 | Vorona | 701/119 |
| 2010/0121565 | A1* | 5/2010 | Uyeki et al. | 701/201 |
| 2011/0046872 | A1* | 2/2011 | Uyeki et al. | 701/200 |
| 2011/0066373 | A1* | 3/2011 | Cabral et al. | 701/208 |
| 2011/0099138 | A1* | 4/2011 | Van Hentenryck et al. | 706/46 |
| 2011/0106416 | A1* | 5/2011 | Scofield et al. | 701/119 |

OTHER PUBLICATIONS

Nesamani, K. S., et al., "Estimation of Vehicular Emissions by Capturing Traffic Variations", Science Direct, Atmospheric Environment 41 (2007) pp. 2996-3008, 2007 Elsevier Ltd., available at URL:http://www.cleanaimet.org/caiasia/1412/articles-73244_resource_1.pdf, as of Jul. 27, 2010.

Mele, Jim, "Forecasting Traffic", published Oct. 1, 2007, FleetOwner, available at URL:http://fleetowner.com/information_technology/feature/real_time_predictive_systems_alternatives_traffic/, as of Jul. 27, 2010.

"The Bright Side of Sitting in Traffic: Drowdsourcing Road Congestion Data", The Official Google Blog, Aug. 25, 2009, available at URL: http://googleblog.blogspot.com/2009/08/bright-side-of-sitting-in-traffic.html, as of Jul. 27, 2010.

Belson, Ken, "Using Data to Forecast Future Traffic Jams", New York Times, Jun. 12, 2010, available at URL: http://www.financialexpress.com/news/Using-data-to-forecast-future-traffic-jams/632655/, as of Jul. 27, 2010.

* cited by examiner

SYSTEMS AND METHODS FOR DETERMINING TRAFFIC INTENSITY USING INFORMATION OBTAINED THROUGH CROWDSOURCING

BACKGROUND

Traffic information has several important applications, including development planning by local and state governments, route scheduling by delivery services companies, and daily commute decisions made by the general public. Data typically collected is comprised of the number of vehicles per unit time, average speed, number of accidents, vehicle types, and roadway classifications. Such traffic information may be used to determine the traffic intensity of a particular roadway or geographic region. Methods to obtain traffic information ideally should provide high coverage while being low-cost and maintainable. In addition, practical methods should be applicable for a wide range of vehicle types and chaotic traffic conditions.

BRIEF SUMMARY

Systems and associated methods for utilizing crowdsourcing probes to obtain traffic information are described. Systems and methods provide that traffic information includes, but is not limited to, location, date, time, speed, and speed limit information. Embodiments allow for the determination of traffic intensity through the calculation of a speed-based metric called Road Speed Capacity (RSC). Embodiments provide that the traffic information and traffic intensity information may be visualized through a user interface.

In summary, one aspect provides a method comprising: defining at least one traffic network, each traffic network comprising at least one road segment; receiving traffic information pertaining to the at least one traffic network from at least one crowdsourcing probe; and determining traffic intensity of the at least one traffic network from the traffic information.

Another aspect provides a system comprising: at least one processor; and a memory operatively connected to the at least one processor; wherein, responsive to execution of computer readable program code accessible to the at least one processor, the at least one processor is configured to: define at least one traffic network, each traffic network comprising at least one road segment; receive traffic information pertaining to the at least one traffic network from at least one crowdsourcing probe; and determine traffic intensity of the at least one traffic network from the traffic information.

A further aspect provides a computer program product having computer readable program code embodied therewith, the computer readable program code comprising: computer readable program code configured to define at least one traffic network, each traffic network comprising at least one road segment; computer readable program code configured to receive traffic information pertaining to the at least one traffic network from at least one crowdsourcing probe; and computer readable program code configured to determine traffic intensity of the at least one traffic network from the traffic information.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
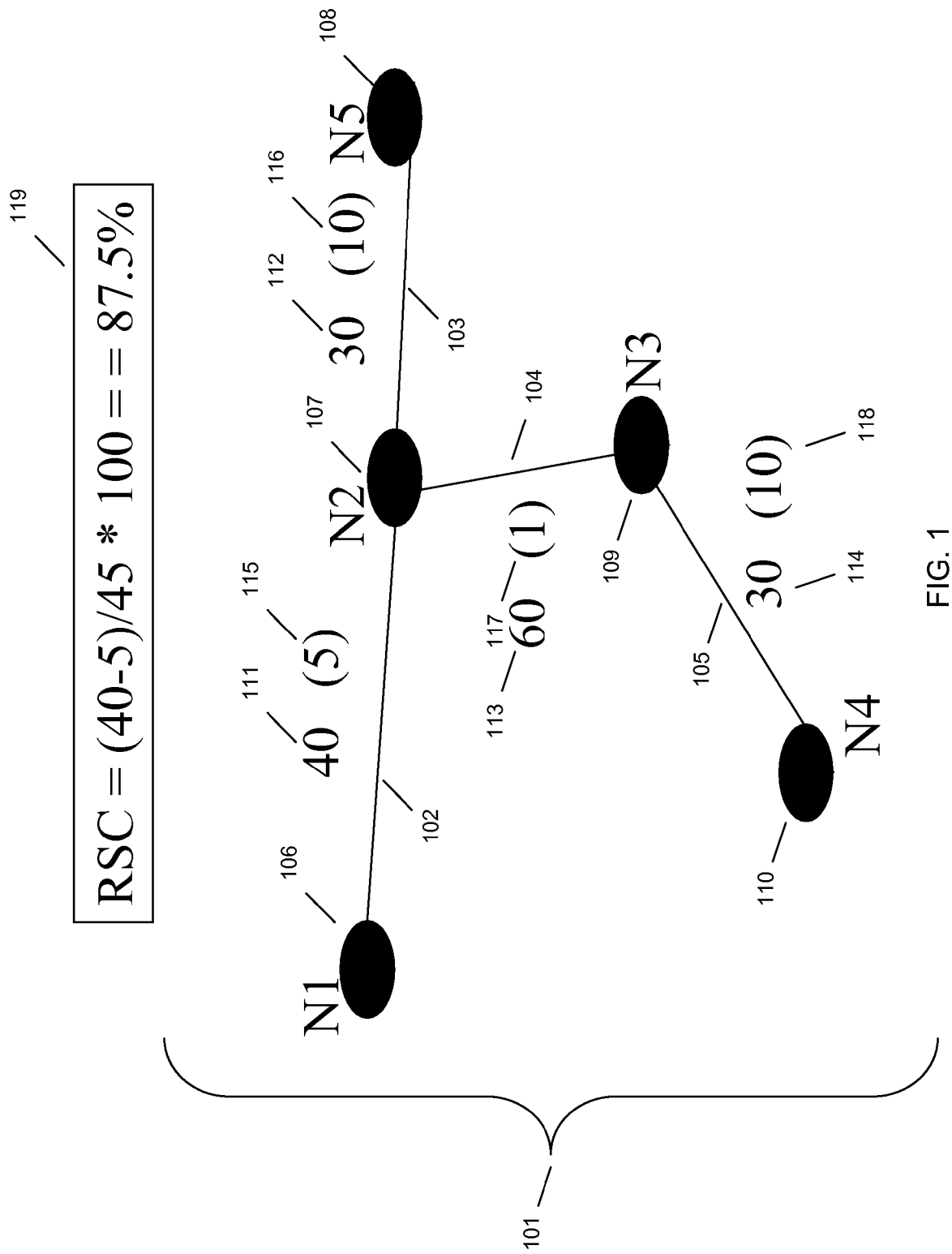
FIG. 1 illustrates an example of determining road speed capacity from traffic information.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

Capturing traffic information on particular roadways or for an entire region is an important function with multiple practical uses. Many methods have been devised for obtaining traffic information. One example is the inductive-loop detector, which is installed in the roadway surface and senses the presence of a conductive metal object (i.e., an automobile) by inducing currents in the object, which reduce the loop inductance. However, its usage is limited mainly to intersections and has high implementation costs. Another example involves video image processors that analyze video data obtained from cameras positioned in various roadway locations. These systems generally require a high cost for purchase, installation and maintenance of the necessary equipment, have camera equipment issues, and require human assistance to operate properly as video data is often difficult to automatically analyze.

More recent methods rely on cellular phone and GPS data. One such method involves the use of a GPS floating car. In this system, a "floating car" is equipped with a GPS unit that acts as a sensor for the road network, sending its location data to a processing center as it moves along a roadway. Although relatively cheaper than previous methods, GPS floating car still involves significant costs. In addition, location errors occur when tall buildings shelter GPS equipment and performance is highly dependent on the regional GPS penetration rate. Another recent method involves the use of mobile traffic probes, wherein cellular phones are used as anonymous traffic probes that monitor the traffic state by tracking the movement of cellular phone bearers. This method is relatively low cost and potentially provides high coverage. However, the mobile traffic probe method is hindered by low accuracy, the need for complex algorithms to improve data quality, and latent data collection.

Although each of these methods is able to capture traffic information, no single solution is ideal for all situations. For example, certain methods are workable on urban streets, but do not function well on highways. Other systems may work well on multiple roadway types, but have accuracy issues or are cost-prohibitive. In addition, collection of reliable traffic data is difficult when traffic is mixed (i.e., various vehicle types) and chaotic (i.e., vehicles not following lanes).

Crowdsourcing has recently been gaining prominence for various purposes, including information collection. In reference to traffic information, crowdsourcing involves utilizing a large group or community of people to provide traffic information traditionally provided by previous methods, such as those described above. For example, a crowd (i.e., the individuals driving on a particular roadway or region) could place a cellular phone call or send an SMS message regarding their location and speed to a radio station or a service that processes such information. In order to prompt such a response from drivers, the radio station or information processing service may possibly send out a request for information. However, before such a request can be made, it would be important to determine what type of information is desired and from what locations. In addition, once the information is received, questions involving how to collect and cleanse the information, how to use the information for measurement and prediction, and the accuracy of the information must be resolved.

Nonetheless, such a system would be very beneficial as a new method for obtaining and processing traffic data. This is especially true in cities of developing countries where, due to the diversity of vehicles and their chaotic movement patterns, it is hard for traditional traffic sensing technologies to work. In addition, existing methods in developed cities are not directly applicable in such regions because they are very costly or inapplicable due to low market penetration (for example, GPS devices), or both. As such, there is a need to acquire traffic data at city scale at low-cost and in a sustainable manner.

The description now turns to the figures. The illustrated example embodiments will be best understood by reference to the figures. The following description is intended only by way of example and simply illustrates certain example embodiments representative of the invention, as claimed.

Embodiments provide for the collection and visualization of traffic information through crowdsourcing. According to embodiments, crowdsourcing traffic information may be collected through methods including, but not limited to, cellular phone calls, SMS messages, email, and Internet portals. As a non-limiting example, a user may access an Internet portal from a portable wireless device and input that they are traveling on Road A with a speed of 35 m.p.h. In addition, embodiments provide that people are not asked blindly for traffic information, rather, such requests are made when the value of input is high, such as when traffic information is needed for improving measurement.

Embodiments provide that traffic information from other traffic information sources may be used in conjunction with information collected from crowdsourcing processes. Non-limiting examples of other traffic information sources include historical traffic data, inductive-loop detection, video image processing, GPS floating car, and mobile traffic probes. Furthermore, traffic information according to embodiments includes, but is not limited to, speed, location, time, and location speed limit.

Referring now to FIG. 1, therein is depicted an example of processing traffic information according to an embodiment. An example road network 101 is comprised of edges 102, 103, 104, 105 and nodes 106, 107, 108, 109, 110. Embodiments provide that a road network represents one or more roads of a particular region. There are N nodes and E edges in the road network. Each edge $e\_i(n\_a, n\_b)$ stands for a road segment between two nodes from N ($n\_a$ and $n\_b$) and represents a directional road that runs from $n\_a$ to $n\_b$. Roads may also be bi-directional roads such that two edges from $n\_a$ to $n\_b$ and $n\_b$ to $n\_a$ are present. As a non-limiting example, each edge may represent a street in an urban setting, while each node may represent specific points along the edges, such as an intersection between two streets.

As shown in FIG. 1, each edge may have a speed limit 111, 112, 113, 114 and a reported speed 115, 116, 117, 118. According to embodiments, the speed limit may be the posted speed limit for the particular segment of roadway, or, alternatively, the fastest speed reported for the segment. In addition, embodiments provide that the reported speed may be the latest speed reported for the edge, or the average speed reported over a certain period of time.

As depicted in FIG. 1, the edge 102 between nodes N1 106 and N2 107 has a speed limit 111 of 40 m.p.h. and a reported speed 115 of 5 m.p.h. According to embodiments, this traffic information is used to calculate the road speed capacity (RSC) 119, which may be calculated by: (speed limit−reported speed)/(speed limit). Thus, for the edge 102 between Nodes N1 106 and N2 107, the RSC 121, expressed as a percentage, is: $(40-5)/(40) \times 100 = 87.5\%$.

Embodiments provide that the RSC represents the capacity of available traffic speed that is being utilized. RSC according to certain embodiments represents the level of congestion on the particular roadway. Further embodiments provide that RSC represents for a particular road edge the maximum speed that a vehicle has attained on that road edge in the recent past. According to embodiments, every road has a default RSC equivalent that gets updated based on user inputs. This value can be higher, lower or the same as the posted speed limit on the particular road edge depending on the situation on the road, such as during construction or on unmonitored roads. Embodiments provide that recent past may be determined through multiple methods. A first method according to an embodiment is as time interval t, measured as RSC_Consumed[i][j], wherein RSC_Consumed is the RSC consumed for road 'i' at time interval 'j.' A second method according to an embodiment is the time epoch measured as RSC_default [i], the default RSC for road 'i.'

Figure 2:
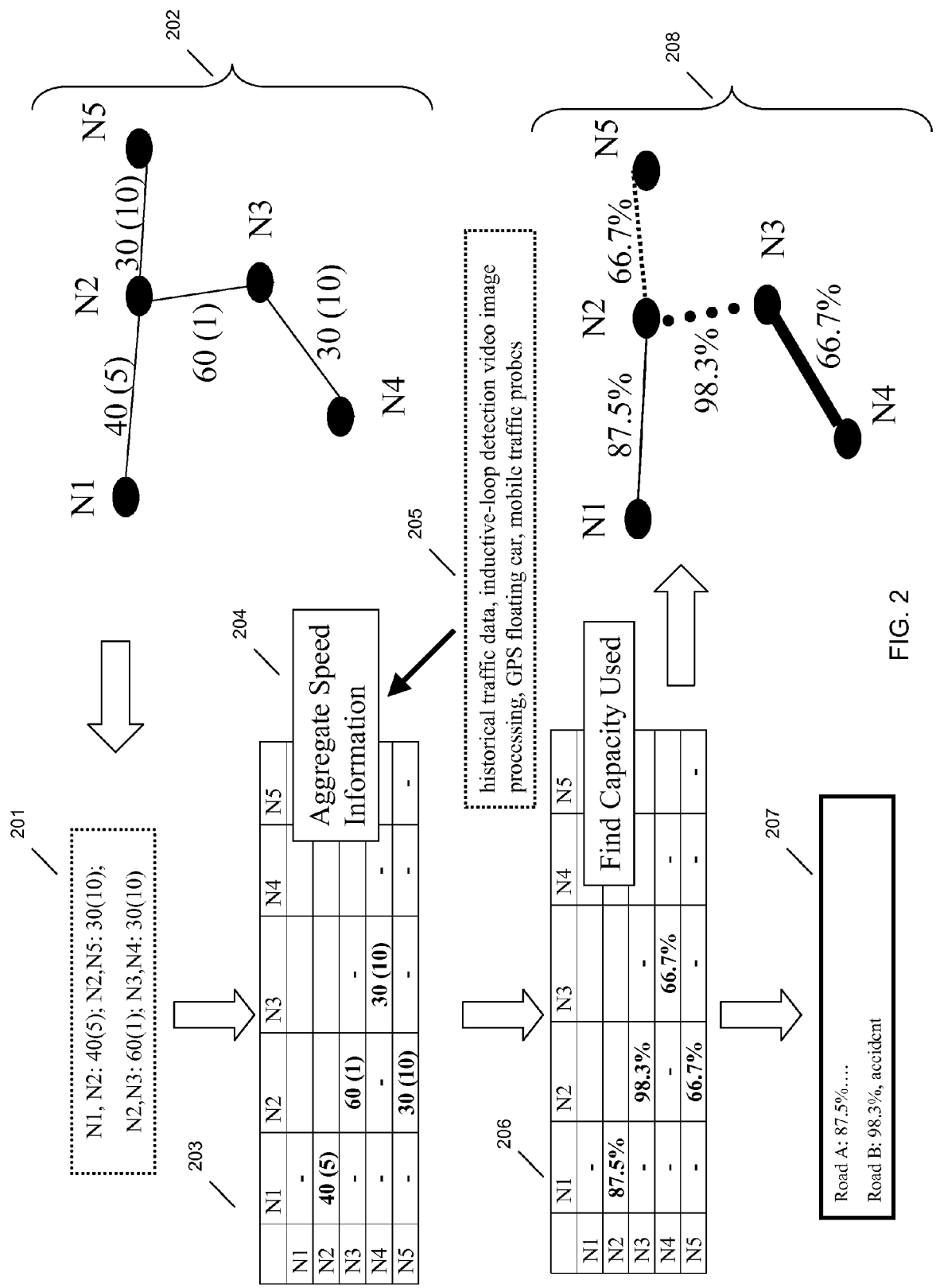
FIG. 2 illustrates an example of obtaining and visualizing traffic information.

RSC may change frequently from time to time. Although the speed limit of a road segment is a particular value, the RSC is allowed to be any speed reported to have been traveled on that road segment. Embodiments provide that when RSC is unknown, it is assumed to be the speed limit of the road the maximum speed reported on the road in that time interval is detected. Additional embodiments provide that RSC portrays the remainder of the road that could support a certain speed, for example, the number of cars that can be supported at a certain speed. As a non-limiting example, if the road capacity was 0%, then 100% of the road capacity is being used. Embodiments provide that RSC is expressed as a percentage of the subject edge's capacity. In addition, embodiments provide that RSC is not dependent on a specific vehicle type, but concerns the fastest vehicle on a particular road edge Referring now to FIG. 2, therein is depicted another embodiment of the invention. Traffic information 201 for an example road network 202 is collected in an information repository 203. The traffic information is aggregated 204 with other traffic data sources 205. Speed capacity 206 is calculated for the traffic information 201 and is made available to data consumers 207 or is visualized 208. As non-limiting examples, data consumers could be a traffic management service, while visualized data may be in the form of a colorized map used by the public through a web portal or mobile device. A map according to an embodiment may visualize high congestion with red, medium congestion with yellow, low congestion with green, and unknown with gray.

Embodiments of the invention provide for data inputs, including, but not limited to, time interval, time epoch, road network, and vehicle speed. The term "time interval" as used herein is intended to be construed broadly so as to encompass, by way of example and without limitation, the basic granularity of time tracked by the system. As non-limiting examples, a time interval may be designated as fifteen minutes, thirty minutes, or one hour. The term "time epoch" as used herein is intended to be construed broadly so as to encompass, by way of example and without limitation, an extended period of time tracked by the system. Embodiments provide that road conditions, including, but not limited to, roadway congestion, are assumed to remain similar during a time epoch on a particular road. A non-limiting example of a time epoch is three months.

An example embodiment provides for a system wherein inputs time interval 't,' a time epoch 'T,' a road network 'R(Nodes; Edges),' and the speed of vehicles at different instances of time '[T, T+t, . . . ]' are received by the system. Embodiments provide that the road network input may be comprised of two choices. A first choice consists of speed capacity for a vehicle on the edge, with infinite speed capacity as the edge's theoretical capacity. A second choice involves a link between nodes, wherein the speed capacity for a vehicle on an edge may be learned over time, for example, the maximum speed capacity in a time epoch. In this example embodiment, a system output may be the measurement of road and congestion levels for the last time interval t. In addition, a variant problem may involve the prediction of the road and congestion levels for a specified period of time.

Figure 3:
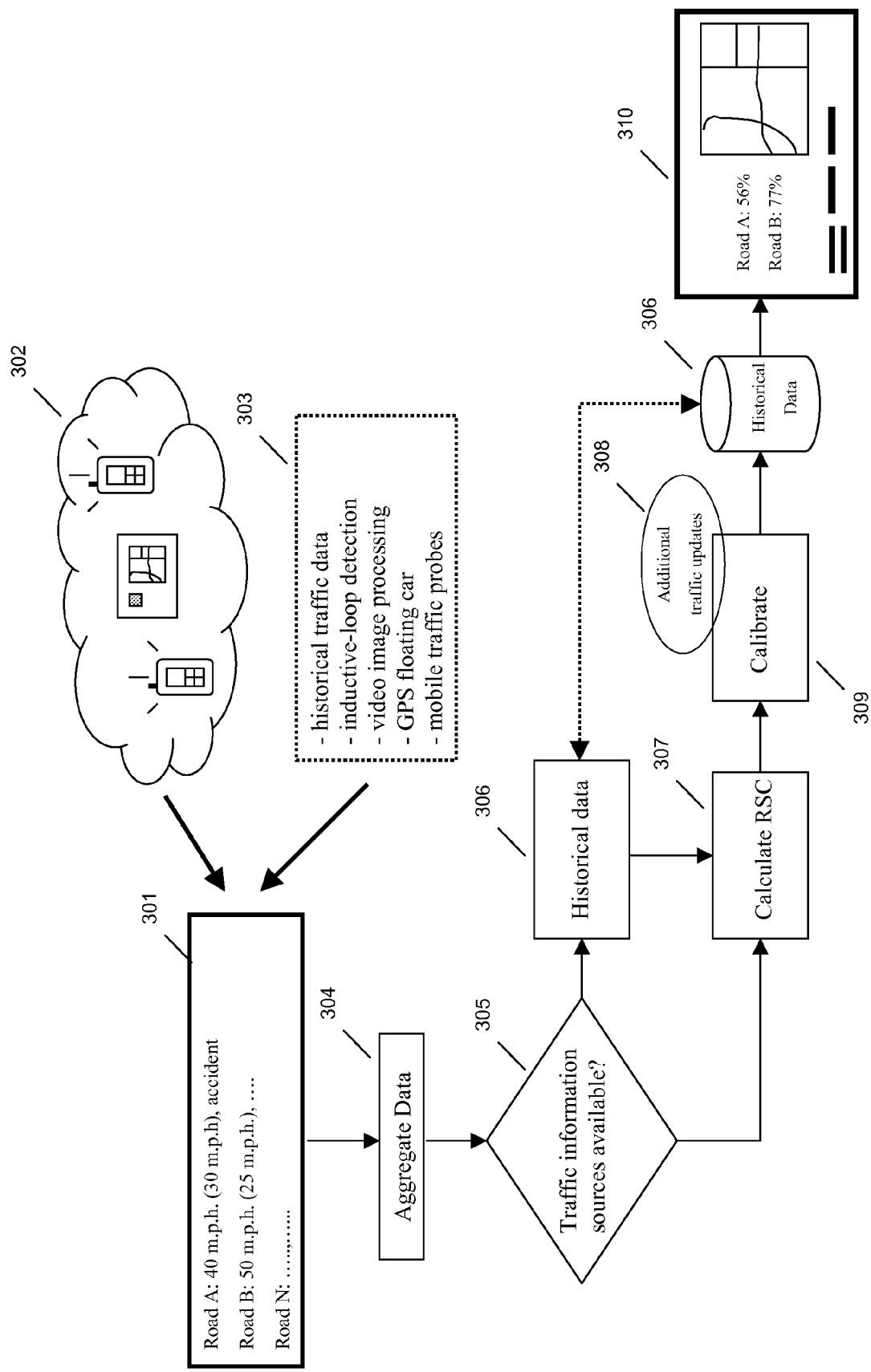
FIG. 3 illustrates an example block diagram of processing traffic information.

Referring now to FIG. 3, therein is depicted an embodiment of the invention. Traffic information 301 is obtained from crowdsourcing probes 302 at specific time intervals and from supplemental traffic information sources 303, if available. The information from the crowdsourcing probes 302 and the supplemental traffic information sources 303 are aggregated 304. Embodiments provide that aggregation involves certain functions, including, but not limited to, averaging, averaging after removing outliers, and Gaussian functions. If traffic information sources are not available 305, historical data 306 may be used. According to embodiments, historical data may include RSC data and speed data. In addition, embodiments provide that estimates may be revised using historical data 306. Non-limiting examples of revisions include increasing estimates exponentially or decreasing an estimate linearly. The RSC 307 is calculated from the available traffic information. Additional traffic updates 308, including, but not limited to, accidents and traffic light outages, may be utilized to calibrate 309 the system. The data is stored 306 and the road network is made available and visualized 310 according to a designated scheme. As a non-limiting example, visualization rules may include coloring roads with a >=95% RSC red, 85-95% yellow, 60-85% green, and unknown RSC in gray.

The following non-limiting example provides an embodiment involving the depiction of a past traffic situation. System inputs are specified as: time interval 't'=fifteen minutes; time epoch 'T'=three months, default speed for region 's'=twenty km/hr; road network=R(Nodes; Edges); RSC for each edge for current epoch=RSC_default[i]; and continuous data of the speed of vehicles in the format Time-i, Road-i, Speed-i, which stands for speed i on road i at time I (for example: 12-May-2010-13 HRS-45 MIN, "XYZ road", "35 m.p.h."). The output for this example embodiment is, for each road segment i, road and congestion level (Road-i, Clevel-i) valid for past time interval t.

Embodiments provide for past traffic depiction wherein system input is the given link between nodes, but not RSC_default[i]. In this embodiment, RSC_default[i] will be designated as the maximum speed reported in the last time epoch on that road 'i'. In addition, embodiments provide for past traffic depiction with additional output including, but not limited to, the 'k' roads at a specific congestion level (for example, congestion >90%). Furthermore, embodiments provide for past traffic depiction and future prediction, wherein an additional output of road and congestion level for a specified period in the future. A non-limiting example of future prediction for road i involves the best-of-five congestion level from the last 5 intervals for road i.

Figure 4:
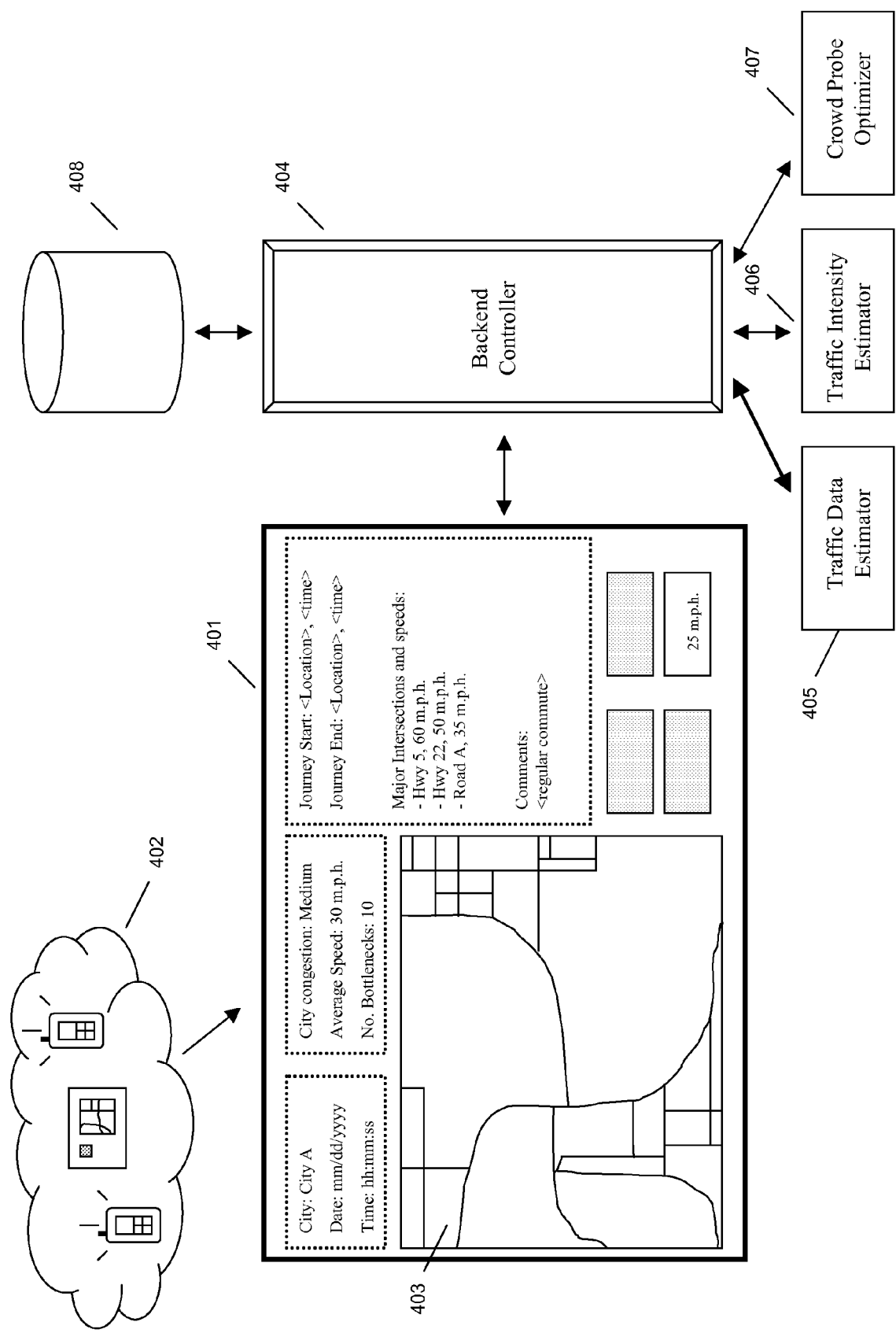
FIG. 4 illustrates an example traffic information user interface.

Referring now to FIG. 4, therein is depicted a traffic information system according to an embodiment. A user interface 401 acquires crowdsourcing input 402 and illustrates traffic conditions 403. A backend controller 404 invokes system functions and updates the user interface 401 accordingly. The backend controller may be called from the user interface 401 or activated periodically, such as every time interval. System functions include, but are not limited to, a traffic data estimator 405, a traffic intensity estimator 406, and a crowd probe optimizer 407 that decides which regions to probe for crowdsourcing input 402. In addition, historical traffic information may be stored in a repository 408.

Embodiments provide a method for the traffic data estimator function with steps including, but not limited to, the following: (1) measurement of traffic information is divided into intervals; (2) the current speed (c_i_j) for road i at interval j is set to the default speed input (for example, the posted speed limit); (3) for each road segment r_i with crowdsource speed input v_i_j, for time interval t_j, the current speed c_i_j is set to v_i_j; (4) if supplemental inputs are available for c_i_j, take their aggregated sum, supplemental inputs include, but are not limited to, additional crowdsource inputs and other traffic probes; (5) use historical information for c_i_j if no updates are available; non-limiting examples include the last c_i_j, or the average of the last five c_i_j's.

The traffic intensity estimator is implemented according to embodiments of the invention through steps including, but not limited to, the following: (1) for each road segment i: initialize RSC_default[i] and Observed_Speed[i]; (2) at each time step j of time interval t, update RSC: (a) obtain Observed_Speed[i][j] for road segment i at time step j, (b) set RSC_Consumed[i][j] equal to RSC_default[i]-Speed[i][j], (c) express in percentage of RSC using the formula RSC_Consumed_Percent[i][j]=(RSC_Consumed[i][j]/RSC_default[i])*100, (d) calibrate RSC_Consumed_Percent with different type of additional updates, non-limiting examples include: (i) accident report: multiply by factor Alpha, subject to upper limit of 100%, (ii) traffic light outage: multiply by factor Beta, subject to upper limit of 100%; (3) Visualize RSC_Consumed_Percent[i]; and (4) store traffic information in historical data repository.

Crowdsourcing inputs are desired when new data has a chance to make a major impact on the system outputs. This is an application of an information theory concept called Expected Value of Perfect Information (EVPI). Embodiments utilize EVPI rules to determine when new information will be valuable and to optimize data probe usage. At system design time, embodiments classify a road's traffic status into different states, including, but not limited to, congestion level, or RSC_Consumed % as minimal, near-saturation and saturated. As a non-limiting example, the exact capacity of RSC_Consumed may be specified as minimal <25%, unsaturated >=25-75%, near-saturation >=75-90%, and saturated >=90%. Rules may be defined for when to probe based on a particular road segment's state. Non-limiting examples of such rules include: (1) data probe is not needed for minimal or saturated; (2) for unsaturated, reduce data probe rates to probe after the passage of multiple intervals; (3) for near-saturation, maintain good coverage over affected roads, such as at every interval; or (4) divide measurement into intervals based on need. In addition, rules may be defined for requesting inputs, including, but not limited to, before and after peak times.

At system run time, embodiments according to EVPI update the status of each road and apply the design time rules described in the preceding paragraph. If crowdsourcing data for other situations are received, they are used to update the historical data repository.

At any value of speed input, the next value of speed may remain the same, increase or decrease. Additional embodiments determine when to request data based on estimating the probability of the next speed value remaining the same, increasing or decreasing. As a non-limiting example, the probability that the input remains the same may be represented by the independent variable e, wherein e<<1. In addition, the probability that the input value increases is 1−(current_usage/road_speed_capacity)−e, while the probability that the input value decreases is (current_usage/road_speed_capacity)−e. Embodiments provide that additional probe requests are determined, inter alia, based upon whether acquiring a new probe will add value beyond the probability formulas.

Figure 5:
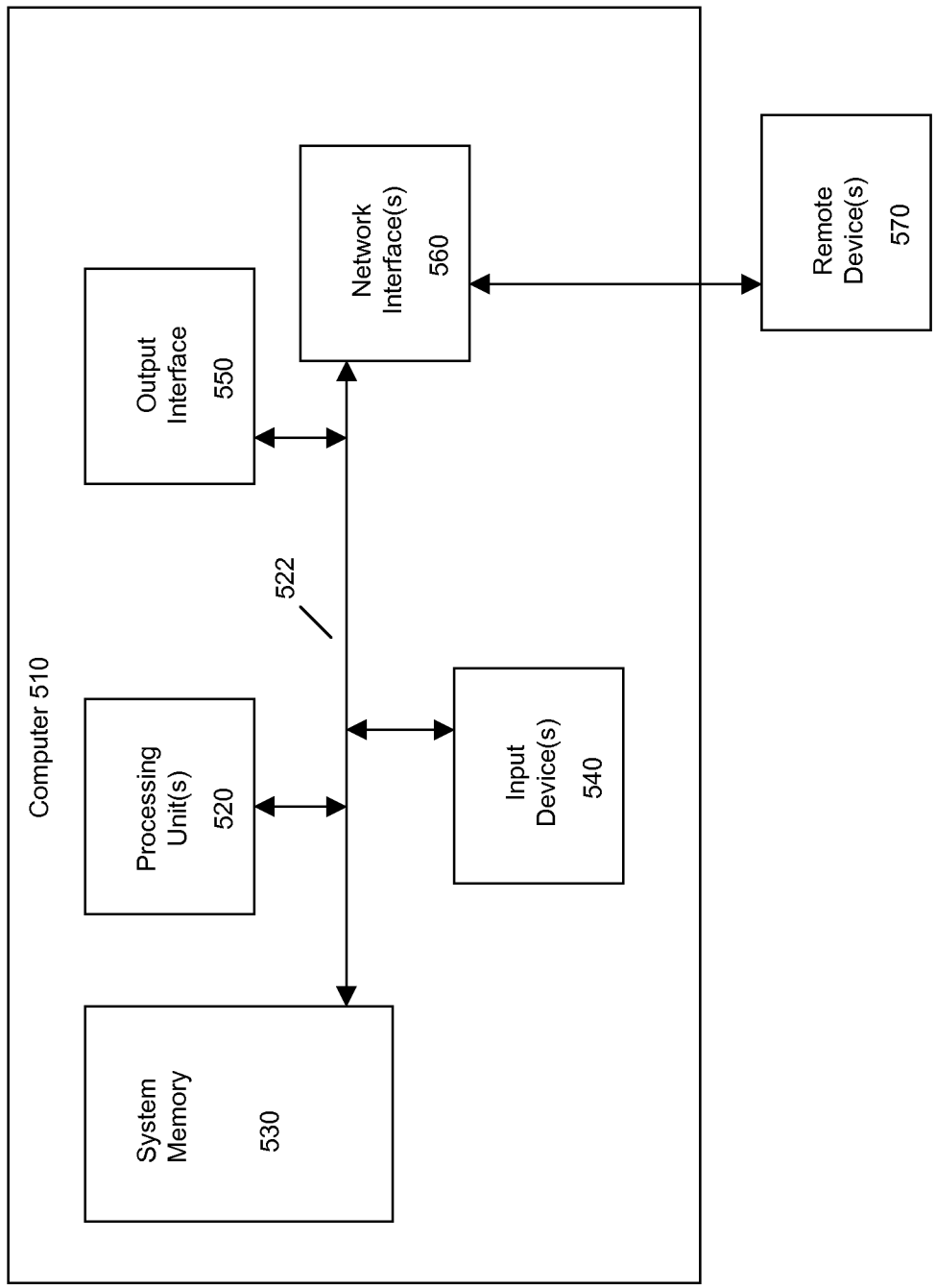
FIG. 5 illustrates an example computer system.

Referring to FIG. 5, it will be readily understood that certain embodiments can be implemented using any of a wide variety of devices or combinations of devices. An example device that may be used in implementing one or more embodiments includes a computing device in the form of a computer 510. In this regard, the computer 510 may execute program instructions configured to create a historical database, extract candidate information, enumerate relevant position features, rank candidates according to fitness score, and perform other functionality of the embodiments, as described herein.

Components of computer 510 may include, but are not limited to, a processing unit 520, a system memory 530, and a system bus 522 that couples various system components including the system memory 530 to the processing unit 520. The computer 510 may include or have access to a variety of computer readable media. The system memory 530 may include computer readable storage media in the form of volatile and/or nonvolatile memory such as read only memory (ROM) and/or random access memory (RAM). By way of example, and not limitation, system memory 530 may also include an operating system, application programs, other program modules, and program data.

A user can interface with (for example, enter commands and information) the computer 510 through input devices 540. A monitor or other type of device can also be connected to the system bus 522 via an interface, such as an output interface 550. In addition to a monitor, computers may also include other peripheral output devices. The computer 510 may operate in a networked or distributed environment using logical connections to one or more other remote computers or databases. The logical connections may include a network, such local area network (LAN) or a wide area network (WAN), but may also include other networks/buses.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method comprising:
   defining at least one traffic network, each traffic network comprising a plurality of road segments;
   periodically, and at predetermined time intervals, requesting updates of traffic information corresponding to the at least one traffic network from a plurality of sources;
   receiving updates of traffic information from the plurality of sources, including traffic information reported from at least one crowdsourcing probe, said traffic information comprising a current vehicle speed;
   with respect to at least one of the time intervals, aggregating the traffic information received from the plurality of sources;
   storing said traffic information as historical traffic data;
   with respect to at least one of the time intervals, utilizing stored historical traffic data as traffic information if no traffic information updates are available; and
   with respect to at least one of the road segments and at least one of the time intervals:
   establishing a default speed;
   determining traffic intensity, wherein determining traffic intensity comprises calculating road speed capacity, road speed capacity being equal to: ((default speed−reported speed)/default speed))*100;
   the reported speed comprising one of: a reported current vehicle speed, an aggregation of reported current vehicle speeds, a vehicle speed based on historical traffic data;
   recalculating road speed capacity, by a respective predetermined factor, in response to at least one of: an accident report, and a traffic light outage;
   providing a visual representation of road speed capacity for at least one user; and
   requesting at least one new crowdsourcing input based on predefined levels of road speed capacity.

2. The method according to claim 1, wherein the at least one crowdsourcing probe comprises at least one of an Internet portal and a cellular phone.

3. The method according to claim 1, wherein the traffic information further includes at least one member selected from the group consisting of: location, date, time, average speed, and speed limit.

4. The method according to claim 1, further comprising: providing traffic information to traffic data consumers.

5. The method according to claim 1, wherein:
   said receiving comprises obtaining traffic information from at least one supplemental traffic data source other than the at least one crowdsourcing probe.

6. The method according to claim 5, wherein:
   said aggregating comprises aggregating the traffic information obtained from the at least one supplemental traffic data source with the traffic information received from the at least one crowdsourcing probe.

7. The method according to claim 5, wherein historical traffic data is utilized as traffic information if the at least one supplemental traffic data source is unavailable.

8. The method according to claim 1, further comprising:
   determining whether to add or remove probes from the at least one crowdsourcing probe based on Expected Value of Perfect Information rules.

9. A system comprising:
   at least one processor; and
   a memory operatively connected to the at least one processor;
   wherein, responsive to execution of computer readable program code accessible to the at least one processor, the at least one processor is configured to:
   define at least one traffic network, each traffic network comprising a plurality of road segments;
   periodically, and at predetermined time intervals, request updates of traffic information corresponding to the at least one traffic network from a plurality of sources;
   receive updates of traffic information from the plurality of sources, including traffic information reported from at least one crowdsourcing probe, said traffic information comprising a current vehicle speed;
   with respect to at least one of the time intervals, aggregate the traffic information received from the plurality of sources;
   store said traffic information as historical traffic data;

with respect to at least one of the time intervals, utilize stored historical traffic data as traffic information if no traffic information updates are available; and with respect to at least one of the road segments and at least one of the time intervals:

establish a default speed;

determine traffic intensity, wherein determining traffic intensity comprises calculating road speed capacity, road speed capacity being equal to: ((default speed−reported speed)/default speed))*100;

the reported speed comprising one of: a reported current vehicle speed, an aggregation of reported current vehicle speeds, a vehicle speed based on historical traffic data;

recalculate road speed capacity, by a respective predetermined factor, in response to at least one of: an accident report, and a traffic light outage;

provide a visual representation of road speed capacity for at least one user; and request at least one new crowdsourcing input based on predefined levels of road speed capacity.

10. The system according to claim 9, wherein the traffic information further includes at least one member selected from the group consisting of: location, date, time, average speed, and speed limit.

11. The system according to claim 9, further comprising: provide traffic information to traffic data consumers.

12. The system according to claim 9, wherein:

to receive comprises obtaining traffic information from at least one supplemental traffic data source other than the at least one crowdsourcing probe.

13. The system according to claim 12, wherein:

to aggregate comprises aggregating the traffic information obtained from the at least one supplemental traffic data source with the traffic information received from the at least one crowdsourcing probe.

14. The system according to claim 12, wherein historical traffic data is utilized as traffic information if the at least one supplemental traffic data source is unavailable.

15. The system according to claim 9, further comprising:

determining whether to add or remove probes from the at least one crowdsourcing probe based on Expected Value of Perfect Information rules.

16. A computer program product comprising:

a non-transitory computer readable storage medium having computer readable program code embodied therewith, the computer readable program code comprising:

computer readable program code configured to define at least one traffic network, each traffic network comprising a plurality of road segments;

computer readable program code configured to periodically, and at predetermined time intervals, request updates of traffic information corresponding to the at least one traffic network from a plurality of sources;

computer readable program code configured to receive updates of traffic information from the plurality of sources, including traffic information reported from at least one crowdsourcing probe, said traffic information comprising a current vehicle speed;

computer readable program code configured to aggregate, with respect to at least one of the time intervals, the traffic information received from the plurality of sources;

computer readable program code configured to store said traffic information as historical traffic data;

computer readable program code configured to utilize, with respect to at least one of the time intervals, stored historical traffic data as traffic information if no traffic information updates are available; and with respect to at least one of the road segments and at least one of the time intervals, computer readable program code configured to perform the following steps:

establish a default speed;

determine traffic intensity, wherein determining traffic intensity comprises calculating road speed capacity, road speed capacity being equal to: ((default speed−reported speed)/default speed))*100;

the reported speed comprising one of: a reported current vehicle speed, an aggregation of reported current vehicle speeds, a vehicle speed based on historical traffic data;

recalculate road speed capacity, by a respective predetermined factor, in response to at least one of: an accident report, and a traffic light outage;

provide a visual representation of road speed capacity for at least one user; and request at least one new crowdsourcing input based on predefined levels of road speed capacity.

* * * * *